United States Patent

[11] 3,595,389

[72] Inventors George W. Morgan
2640 East Norm Place;
Douglas S. Whitney, 2616 East Norm Place,
both of Anaheim, Calif. 92800
[21] Appl. No. 16,685
[22] Filed Mar. 5, 1970
[45] Patented July 27, 1971

[54] RECLAMATION METHOD AND APPARATUS
17 Claims, 5 Drawing Figs.
[52] U.S. Cl. .................................................. 209/125
[51] Int. Cl. .................................................. B07c 7/04
[50] Field of Search ........................................ 209/125,
123, 122

[56] References Cited
UNITED STATES PATENTS
2,328,299 8/1943 Schwab ...................... 209/125
2,377,619 6/1945 Ernst .......................... 209/125 X Primary Examiner—Allen N. Knowles
Attorney—Christie, Parker & Hale ABSTRACT: Apparatus and method for economically separating reusable paper, cardboard, rags, metal, glass and the like from mixed household refuse is described. A separation station, preferably at a refuse transfer point, has a plurality of feed conveyors for moving mixed refuse past a plurality of work stations where valuable components of the mixed refuse are removed. These components are placed in receiving hoppers which communicate by chutes with a matrix of conveyor belts below the floor level of the work stations. Each work station has a plurality of such hoppers, each for receiving a particular component such as, for one example, cardboard, and the several cardboard hoppers feed onto "cardboard" conveyors for continuously moving the cardboard to a baling station or the like. Separate conveyors carry other components, such as metal, glass, paper or the like to separate processing stations. Some of the conveyors, preferably those handling large volume, run transverse to the feed conveyors and in opposite directions for carrying the bulkiest products to separate locations. Other conveyors at different elevations from the transverse conveyors run parallel to the feed conveyors for moving other products. Thus, each feed belt has a plurality of work stations, and each work station has a plurality of product-receiving hoppers. Each product-receiving conveyor serves a plurality of product-receiving hoppers of the same kind. Thus a large volume of refuse can be sorted rapidly and economically with most of the material handling being done automatically.

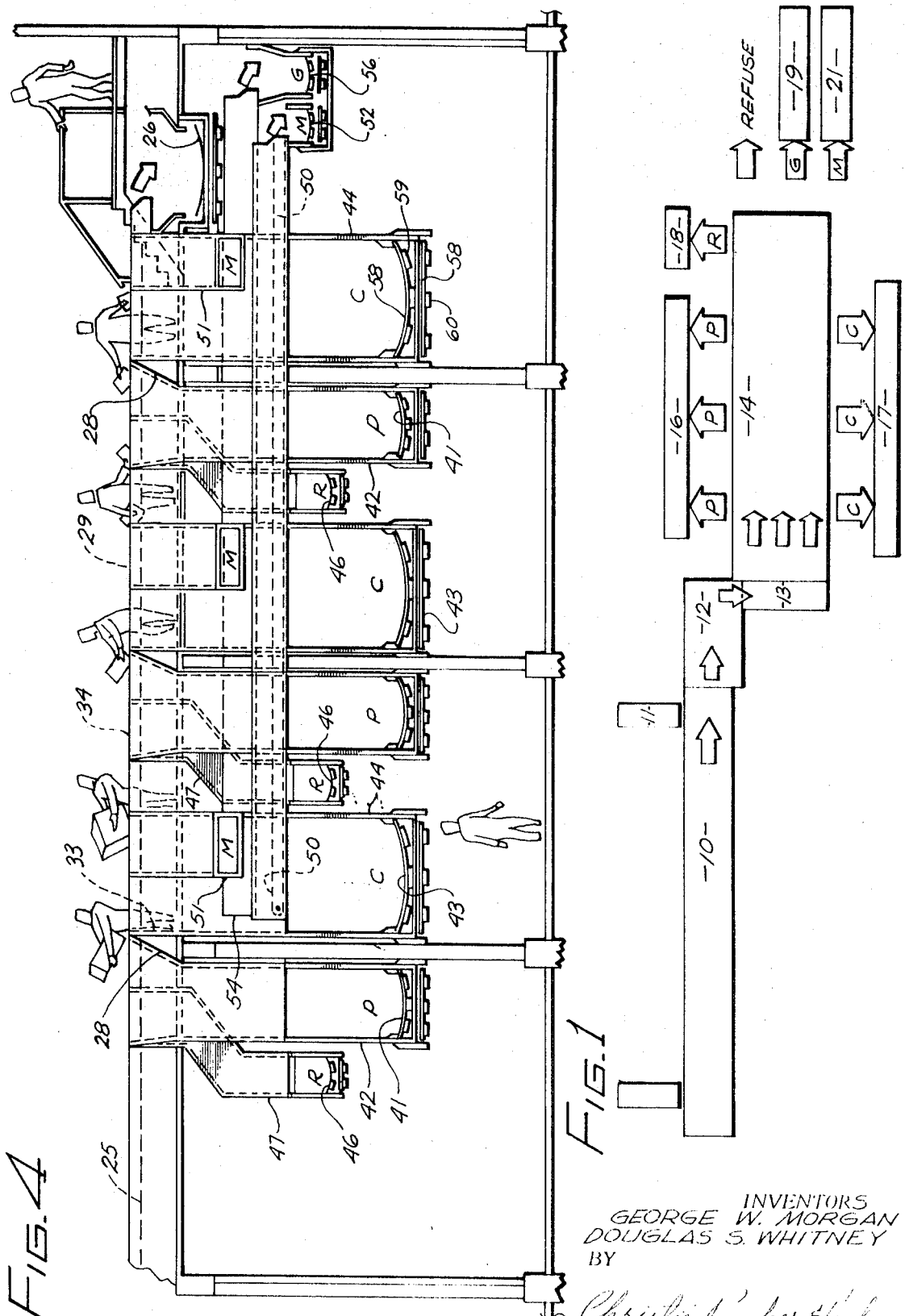

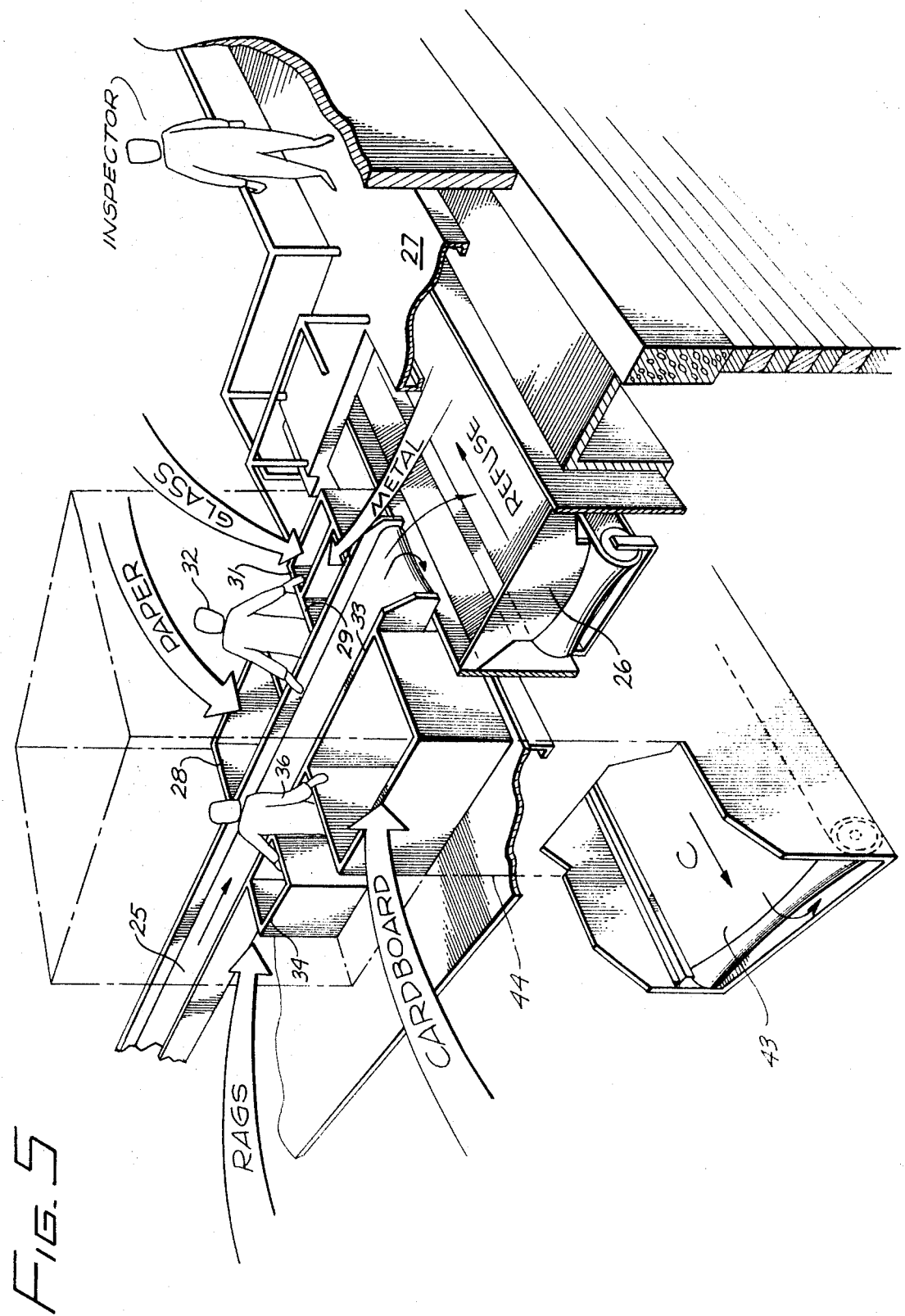

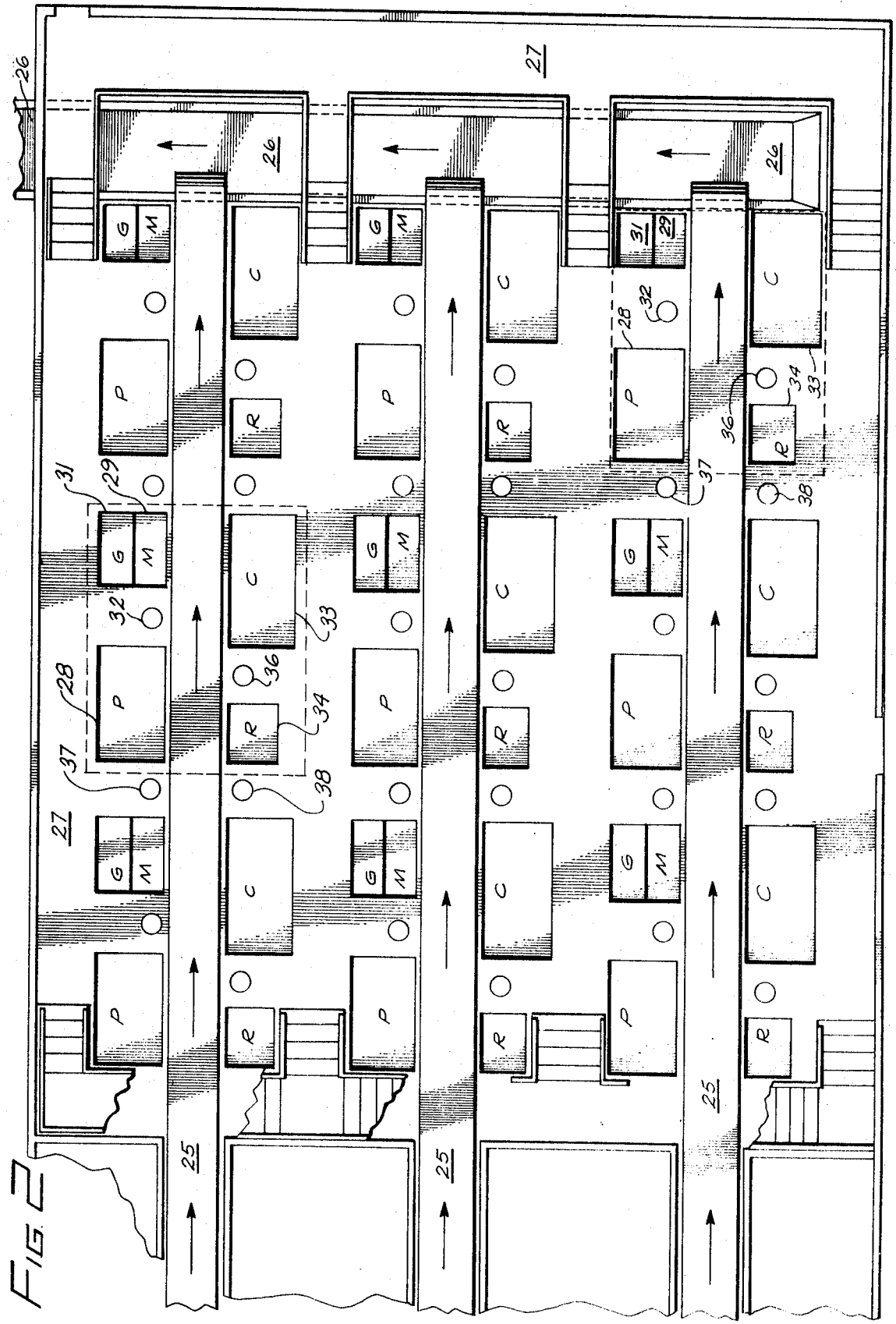

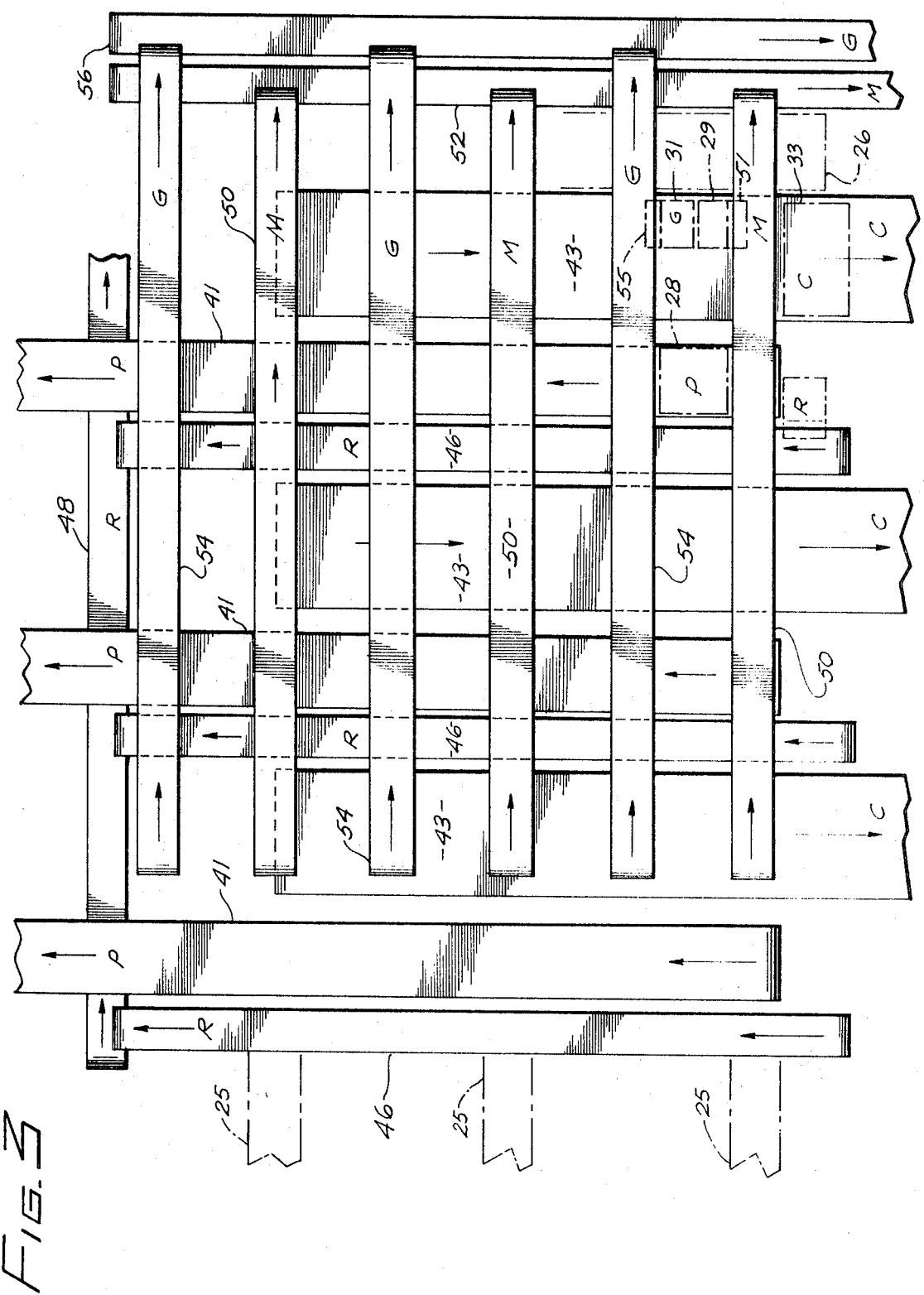

3,595,389

RECLAMATION METHOD AND APPARATUS

BACKGROUND

A major problem in our modern affluent society is the production and disposal of solid waste materials which are commonly discarded and usually buried in cut-and-cover dumps. This not only involves substantial problems in the effective disposal of waste but also amounts to an enormous expenditure of natural resources which are in no way reclaimed. There is a large value in the great variety of products presently disposed of; however, with prior techniques it is usually uneconomical to salvage more than a limited portion of the most valuable of these products. At present the only techniques even slightly successful have involved manual selection of relatively large articles or particularly high-value articles from mixed refuse for purposes of salvage. This is inefficient and in many cut-and-cover operations is not permitted in order to avoid interfering with the disposal trucks. Some salvage is accomplished by organizations saving newspaper and the like, and successful use has been made of masonry and similar refuse when isolated prior to mixing with household refuse.

Some efforts have been made to mechanize the handling of solid waste in order to produce a useful product; however, most of these techniques have suffered from the difficulty that a tremendous melange of materials is present is household and industrial refuse, and the mechanical arrangements have been, in general, unsatisfactory for handling the variety of products having varying properties.

A common technique for handling refuse at present involves collection trucks preceding from door to door collecting refuse and packing it into the trucks. The local collection trucks transport it into the to a centrally located transfer station where the thoroughly mixed refuse is transferred to larger, special purpose trucks that convey the refuse to more remote locations where it is dumped. A vast variety of material varying enormously in size, composition, weight, density, and value passes through the transfer stations. Thus, for example, the mixed refuse may include newspapers, metal in a variety of forms, cardboard boxes, bottles, garbage, tires, garden trimmings, clothing, dirt, masonry, wood, etc. Many of these materials have value and are presently lost, or only recovered with great inefficiency.

It is therefore, desirable to provide a method and apparatus for rapidly and economically separating valuable components from solid waste materials and thereby recovering the value, minimizing the loss of natural resources, and alleviating the problem of dumping the solid wastes, and if desired retaining harmful substances now being buried as a pollutant of underground water supplies.

BRIEF SUMMARY OF THE INVENTION

Thus, in practice of this invention according to a preferred embodiment, there is provided an apparatus for sorting a mixture into its separate components comprising a feed conveyor for moving the mixture past a plurality of work stations, at each of which partial sorting of the mixed components is conducted for obtaining separated components. The separated components are placed in a plurality of receivers at each of the work stations from whence they fall to a matrix of conveyors beneath the work stations for separately conducting the separated components to recovery stations.

DRAWINGS

These and other features and advantages of this invention will be appreciated as the same becomes better understood by reference to the following detailed description of a presently preferred embodiment when considered in connection with the accompanying drawings wherein:

FIG. 1 illustrates in plan a general plant layout for an apparatus constructed according to principles of this invention;

FIG. 2 illustrates in plan a work station level for separating refuse;

FIG. 3 illustrates semischematically in plan a matrix of conveyors below the work station level of FIG. 2;

FIG. 4 illustrates a vertical cross section of the apparatus of FIGS. 2 and 3; and FIG. 5 illustrates in perspective a single work station in the apparatus of FIGS. 2 and 3.

Throughout the drawings like reference numerals refer to like parts.

DESCRIPTION

FIG. 1 illustrates a separating station constructed according to principles of this invention. As illustrated in this preferred embodiment, there is provided an elongated dumping bin 10 into which refuse trucks 11 dump refuse in a conventional manner. A number of truck-dumping stations are provided along the bin so that, for example, as many as 40 truckloads of refuse per hour can be accommodated. Conventional means (not shown) convey refuse from the bin 10 to an intermediate station 12 which may provide for an appreciable temporary storage of refuse, in combination with the inherent capacity of the receiving bin 10, for accommodating surges in input or output from the system. Additionally, the station 12 may process the refuse by loosening the compacted material from the trucks, deodorizing, disinfecting, moistening, drying, ripping open sacks, or the like. A conveyor 13 then conducts refuse from the intermediate station 12 to a separation station 14 where valuable components are separated from the waste products.

The flow of material through the system is indicated by arrows in FIG. 1 with arrows corresponding to valuable products labeled with letters designating a particular valuable product. Thus, the symbol P indicates paper such as newsprint, magazines and the like, which in domestic waste amounts to about 35 percent by weight of the total waste in a typical metropolitan area. The symbol C indicates cardboard such as from boxes or the like, which comprises about 18 percent by weight of domestic waste. Although only about half the weight of paper, the cardboard may occupy a considerably larger volume because of its lower density and poorer packing. The symbol R indicates rags, such as discarded clothing and other fabric, which comprises about 1 percent by weight of domestic waste. Although the percentage of rags in waste is not extremely high, this product has a relatively high value in a scrap market and can economically be recovered. The symbol G represents glass, such as bottles and other containers, which is present in domestic waste as about 5 percent by weight. The glass recovered may, if desired, be separated into bottles and other containers suitable for reuse, and other glass which is valuable for starting glass furnaces. The symbol M represents metal which is normally present in domestic waste as about 1 percent by weight. In the separation station herein described, metal is indiscriminately separated from other materials, and if desired the metal can be passed to a second station for sorting into ferrous materials, copper, aluminum, etc.

The balance of the domestic wastes, namely about 40 percent by weight, comprises a mixture of garbage, garden trimmings, grass, dirt, concrete, plastic and the like which presently do not have sufficient value to be worth recovering. This refuse is discharged and dumped in a conventional manner. Noting the above quantities of paper, cardboard, glass, metal and rags in domestic waste, it will be apparent that even with certain losses as may well occur during operation of a system, as much as one-third to one-half of the weight of presently discarded domestic waste can be salvaged for a consequent saving of natural resources and recovery of substantial value.

The materials from the separation station 14, hereinafter described in greater detail, pass to receiving stations for further processing. Thus, for example, paper P is conveyed to a baler or balers 16 where it is packed into bales in a conventional manner for shipment to an ultimate user. Similarly, the cardboard C is conducted to a baler 17 to be baled for shipment. The rags R are conducted to a conventional rag baler 18, and the glass G and metal M are conducted to receiving stations 19 and 21, respectively, where they may be temporarily stored for shipment or further sorting, or they may be discharged directly into railroad cars for removal. As mentioned hereinabove, refuse from the separating station 14 may be conducted to a conventional cut-and-cover dump or the like.

If preferred, the final refuse from the separating station can be ground and impregnated with bacteria or other additives to produce organic compounds suitable for agricultural use. The added bacteria start immediate decomposition of organic and many inorganic materials, thereby neutralizing many harmful chemical materials and making essential food elements readily available to plant life. Appropriate additives can be made at this point to balance the PH and other properties of the compost.

It is preferred that the plant illustrated in FIG. 1 be located at a refuse transfer station since this is normally relatively centrally located for the convenience of local trash trucks. If desired, however, the plant can be located at the dumping site. Location at the transfer station is preferred since this site is more likely to be permanent than the dump which may become filled. The transfer station is normally nearer to a railroad siding, major highways, and industrial users of the products recovered from the domestic waste.

FIG. 2 illustrates in plan view the working level of a separation station 14 constructed according to principles of this invention. This working level is normally about 21 feet above a prevailing grade. Domestic waste enters the separation station from the conveyor 13 (FIG. 1) by way of three parallel feed conveyors 25 that run along the length of the separation station in a direction as indicated by the arrows. At the discharge end of the feed conveyors 25 is a refuse conveyor 26 running transverse to the feed conveyors for receiving refuse after valuable materials have been removed therefrom and conveying the refuse either to a trucking station for removal or directly to a dumping station (not shown).

A peripheral walkway 27 is provided around the entire working level for providing access by workmen. Along each of the three delivery or feed conveyors 25, three work modules (two of which are indicated by the dashed boundaries in FIG. 2) are provided, at which positions manual separation of valuable materials from the domestic waste is accomplished. One such work module and certain surrounding facilities are illustrated in perspective in FIG. 5, and a portion of such work modules can be seen in FIG. 4.

Five receiving hoppers are provided within each work module for receiving separated valuable components from the waste. Thus, at each module there is a receiving hopper 28 having a relatively large top opening for receiving waste paper. On the same side of the feed conveyor 25 there is also provided a smaller hopper 29 for receiving metal and a third open hopper 31 for receiving glass. A worker 32 is normally stationed between the open hoppers 28, 29 and 31 at each station so that the paper hopper 28 is on his right hand, and the metal hopper 29 and the glass hopper 31 are at his left. Each working module also includes an open topped cardboard hopper 33 on the opposite side of the feed conveyor 25 from the paper hopper. A relatively smaller rag hopper 34 is provided on the same side of the belt as the cardboard hopper, and a worker 36 is normally stationed between the two open hoppers so that the cardboard hopper is on his right and the rag hopper is on his left. Within each of the three work modules the hopper for the larger and more common component is to the right of the worker for ready access by the majority of workers.

As mentioned hereinabove, three such work modules are provided along the length of each of the delivery conveyors 25, and a pair of workers 32 and 36 are provided within each work module. In between adjacent work modules another worker 37 is provided having a metal hopper 29 and a glass hopper 31 from one module on his right hand and the larger paper hopper 28 of the adjacent module on his left hand. Similarly, between adjacent work module, a worker 38 is provided having the rag hopper 34 from one module on his right hand and the cardboard hopper 33 from another module on his left hand. Thus, along the length of each of the feed conveyors there are provided five workers 32 and 37 having access to hoppers for paper, metal and glass, and five additional workers 36 and 38 are provided having access to hoppers for cardboard and rags. These five opportunities to select valuable components from the mixed waste are provided with three work modules. If desired, the sorting station can have a larger number of similar work modules along each belt and the number of workers on each side of the belt is $2n-1$ where $n$ is the number of work modules along the feed conveyor.

Even though there are physically only three work modules built along each belt 25, it is of special importance to note that there are five work stations per belt; each of the work modules being manned by a pair of workmen of opposite sides of the belt. Each pair of workmen thus has convenient access to five receiving hoppers which accommodate the principal categories of waste. Additional hoppers can, of course, be added when additional components of waste become profitable to separate. Thus, the five receiving hoppers provided at each work module each perform a dual function by serving workers at two work stations (except for a portion of the hoppers at the end modules). Workers 32 and 36 form a work pair to handle all types of components to be recovered. Similarly, workers 37 and 38 form a work pair to handle all types of waste components. The dual use of each of the receiving hoppers permits economic and efficient utilization of a number of sets of receiving hoppers by an appreciable larger number of workmen.

As waste material travels along the delivery conveyor 25 from left to right in FIG. 2, the first two operators 32 and 36 will normally remove the larger articles, mostly cardboard boxes and paper, and drop these articles into the appropriate hopper. As the waste material proceeds along the feed conveyor, successive workers have an opportunity to pick articles of metal, glass, paper, rags and cardboard from the mixed refuse on the belt and drop these into the respective hoppers. Thus, in the illustrated embodiment there are five opportunities as the waste material travels along the length of the belt to pick out items of value for salvage, and these articles are deposited in selected receptacles so as to be mutually separated.

Such manual separation can be conducted rapidly and economically since all of the waste is conveyed serially past several workers, each of which has opportunity to select articles of value, and merely pick them from the mixed waste for deposit in the appropriate hopper. There is no need for the workers to carry the selected articles any distance or take any great care in placing them The 30 workers provided in the illustrative embodiment can effectively remove the major portion of items of value from domestic waste, at a rate of about 60 to 65 truckloads of domestic waste per hour with each truckload containing about 55 cubic yards.

It is important to note that the modular layout in the sorting station, along with the cross matrix of conveyor belts is easily adapted to larger or smaller capacities. Thus, for example, a small city may employ fewer than three feed belts 25 whereas a very large city having a single transfer station may have eight, 10 or more sets of belts in a matrix as described herein. Apparatus provided in practice of this invention is therefore especially adaptable to differences in urban size and is expandable to accommodate urban growth.

Below the working level illustrated in FIG. 2 there is provided a matrix of conveyors for continuously removing material from the receiving hoppers on the working level. Chutes assure that the separated material in the hoppers falls onto the conveyors for removal and conveyance to a remote baler or other utilization station. It may be noted that the conveyors for feeding domestic waste, removing refuse or removing separated components can be conventional conveyor belts, chain and drag types of conveyors, or the like. It is generally preferred that belts be employed for minimizing maintenance problems caused by encounter with the variety of materials in the waste products.

FIG. 3 comprises a plan view of the matrix of conveyors below the working level, and in this view the location of the feed conveyors 25, refuse conveyor 26, and various receiving hoppers arranged above the matrix of conveyors is shown in phantom to indicate the vertical location of these elements above the matrix. The cross section of FIG. 4 taken along one of the feed conveyors also shows the relative positions of hoppers, belts and work stations.

Three paper conveyors 41 are provided in the illustrative embodiment at the lowest level of the matrix running in a direction transverse to the feed conveyors 25. The three paper conveyors 41 each serve three of the hoppers 28 on the working level and continuously remove paper therefrom and convey it to the baler 16 (FIG. 1). Since the paper comprises a major fraction of the total weight of reclaimed material, and is relatively bulky, it is preferred to run the paper conveyor 41 transverse to the feed conveyors in order to provide sufficient room for the relatively large baler or balers required to handle the volume of material. The paper hoppers 28 are provided with a vertical chute 42 leading down to the conveyor 41 so that paper merely falls directly to the conveyor.

In a similar manner three large conveyors 43 are provided for removing cardboard from the cardboard hoppers 33. The three cardboard conveyors are directly beneath the cardboard hoppers 33 and are connected thereto by vertical chutes 44 so that cardboard thrown into the hopper merely falls to the belt 43 which continuously removes it from the hopper. The three cardboard conveyors are also transverse to the feed conveyors 25 and conduct the bulky cardboard in the opposite direction from the direction the paper is conveyed so that the cardboard and paper balers, which are both large, can be provided on opposite sides of the separation station.

Parallel to the paper and cardboard conveyors there are provided three rag conveyors 46 to which rags are directed from the hoppers 34 by angled chutes 47 (FIG. 4). The rag conveyors continuously remove rags from the hoppers 34 and carry them to a rag collection conveyor 48 at the discharge end of the three rag conveyors 46. The collection conveyor 48 accumulates the rags and takes them away from the separation station for further processing or shipment. In the illustrated embodiment, the rag conveyors 46 are at a slightly higher elevation than the paper and cardboard conveyors 41 and 42; however, this is not essential and these conveyors can be at the same level or lower as may be desired to provide clearance beneath the working level.

Directly beneath each of the feed conveyors 25 is a metal conveyor 50 traveling in the same direction as the feed conveyors. The metal hoppers 29 communicate with the metal conveyor 50 by an angled chute 51 so that metal articles pass downwardly and laterally from the hopper to the conveyor. The three metal conveyors 50 have at their discharge end a transverse metal collection conveyor 52 which accumulates metal articles from the three conveyors and conducts them from the separating station to a remote location for further sorting or shipment as desired.

By arranging the metal conveyor 50 beneath the feed conveyor 25 it becomes possible to employ a conventional magnetic pulley (not shown) at the discharge end of the feed conveyor to collect small ferrous articles such as nails, bits of wire or the like that would not normally be picked up in the manual separation. These articles when stripped from the magnetic pulley can then be dropped directly onto the metal conveyor.

Parallel to the feed conveyors 25 and metal conveyors 50 are three glass conveyors 54. The glass hoppers 31 communicate with the respective glass conveyor 54 by an angled chute 55 so that glass articles dropped into the hopper pass downwardly and laterally onto the glass conveyor 54 and are continuously removed. The three glass conveyors 54 discharge the glass articles onto a transverse glass collection conveyor 56, which conducts the glass articles to a remote location for shipment.

In the illustrated embodiment, the metal conveyors 50 and glass conveyors 54 are at a higher elevation than the paper and cardboard conveyors so that these transversely arranged conveyors do not intersect. In addition, the metal and glass conveyors are arranged so as to avoid intersecting the chutes 42 and 43 for the paper and cardboard, respectively, so that these chutes handling large, bulky materials have substantially vertical walls. These conveyors also avoid intersecting the chutes 47 for the rag conveyors so that only a single deflection is required for the rags to fall from the hopper to the conveyor.

By providing a matrix of closely interlaced conveyors running transverse to each other, the work stations can be arranged closely together for minimizing the size of building required to shelter the equipment and crew, and also so that all workers have ready access to their respective hoppers. With such an arrangement, five pairs of workers can be accommodated with three work modules, thereby providing five opportunities to select valuable materials from the domestic waste while only requiring capital investment for three work modules. This arrangement, therefore, provides for efficient utilization of equipment and manpower.

In the illustrated embodiment, each of the conveyors is illustrated as a conventional flexible conveyor belt of a suitable size and material for handling the particular material on that belt. Thus, for just one example, a cardboard conveyor 43 has a conventional rubberized belt 58 (FIG. 4) carried on idler rollers 59 so as to present a concave upward face for conveying pieces of cardboard. After discharging the cardboard, the belt returns to its beginning on additional idlers 60. The other belts are also conventional and similar in structure and operation.

An apparatus as described and illustrated herein having a matrix of work stations and interlaced conveyors has many advantages in addition to the ability to provide many opportunities for selecting valuable components with a minimal capital investment. The matrix of work stations permits shutdown of segments of the matrix in order to accommodate variations in the quantity of material being processed. The matrix also permits temporary shutdown of portions of the matrix for maintenance without interrupting the principal sorting functions. The illustrated matrix can be completely serviced and maintained from the lower side without interrupting operations on the floor level where sorting workers are stationed. The close matrix of conveyor belts permits the processing of the refuse in a building as small and inexpensive as possible and places the work force in an area that is readily visually inspected by an inspector to verify the efficiency of removal of valuable materials.

By arranging the relatively large conveyor belts for paper and cardboard in a direction transverse to the flow of mixed refuse, these bulky products are spatially separated from the unsorted mixed refuse for optimum site utilization. These large conveyors are of a sufficient size to permit a man to enter in case of jamming of materials on the belts. The smaller conveyor belts for rags, metal and glass are all directed to an exterior wall of the building and long cleaning rods can therefore be pushed or pulled through ports in the building walls to alleviate jamming without prolonged shutdown.

Although only limited embodiments of separation station having a three-dimensional matrix of conveyors for separating valuable components from domestic waste has been described and illustrated herein, many modifications and variations will be apparent to one skilled in the art. Thus, for example, other or additional components of value may be selected, and hoppers and conveyors for these components also be provided, likewise as effective automatic equipment for separating certain components of the domestic waste are developed, they can readily be substituted for one or more of the manual work modules along each of the conveyors. Many other modifications and variations will be apparent to one skilled in the art, and it is therefore to be understood that within the scope of the appended claims the invention may be practiced otherwise than as specifically described.

What we claim is:

1. Apparatus for sorting a mixture of articles into separate components of the mixture comprising:
   a feed conveyor for moving a mixture;
   a plurality of work modules for partial sorting along the conveyor, each work module including a plurality of receivers for separated components of the mixture;
   a plurality of conveyor means below the work modules for continuously moving different separated components with each of the conveyor means, each of the conveyor means passing beneath a plurality of receivers for the same component;
   means for passing a separated component from a receiver to the corresponding conveyor means; and
   means for discharging remaining mixture at the end of the feed conveyor after partial sorting; and wherein each work module comprises:
   a first position for occupation by a worker and wherein a first one of the receivers in to the right of the position and a second of the receivers is to the left of the position; said apparatus further comprising:
   a second position for a worker between each pair of adjacent work modules along the feed conveyor so that the first receiver of one station is on the left hand of the second position, and the second receiver of an adjacent station is on the right hand of the second position so that $2n-1$ workers occupy work modules where $n$ is the number of work modules along the feed conveyor.

2. A three-dimensional matrix of conveyors comprising:
   a plurality of parallel feed conveyor means for continuously moving a mixture of components across an upper level of the matrix;
   a plurality of parallel receiving conveyors transverse to and below the feed conveyors for continuously moving separated components of the mixture laterally from the matrix;
   a plurality of parallel receiving conveyors parallel to and below the feed conveyors for continuously moving separated components of the mixture from the matrix, the receiving conveyors parallel to the feed conveyors being in a different plane from the conveyors transverse to the feed conveyors;
   means at the discharge ends of the parallel conveyors for removing like components from the conveyors; and
   a plurality of work modules above the intersection of conveyors when projected to a horizontal plane and communicating vertically through the matrix for transferring separated components to selected parallel receiving conveyors, a plurality of work modules being arranged serially along each feed conveyor means.

3. A three-dimensional matrix of conveyors as defined in claim 2 further comprising means at the discharge ends of the feed conveyor means for receiving unseparated mixture therefrom.

4. A three-dimensional matrix of conveyors as defined in claim 3 wherein each of the work modules comprises a manual separating station at the level of the feed conveyor means;
   a plurality of component open top receiving hoppers at the level of the feed conveyor means; and
   chutes for passing separated components from the hoppers to selected lower parallel conveyors.

5. A three-dimensional matrix of conveyors as defined in claim 4 further comprising:
   a second work station intermediate each pair of first work modules and providing a worker position between hoppers of adjacent work modules so that workers in the first and second stations can both use the same hoppers for separated components of the mixture.

6. A method for separating valuable components from domestic waste comprising the steps of:
   continuously conveying a mixture of domestic waste past a plurality of serially arranged work modules;
   manually separating a portion of selected components from the mixture at each of the work modules; and wherein the step of separating comprises selecting and removing the same selected components at substantially all of the work modules;
   dropping the separated components to a lower level;
   continuously conveying the separated components at the lower level laterally and separately;
   collecting the separated components separately; and
   discharging mixed refuse remaining after selected components are separated therefrom.

7. Apparatus for separating valuable components from mixed domestic waste or the like comprising:
   a plurality of feed conveyors for continuously moving mixed waste along parallel horizontal open paths;
   means at the discharge end of the feed conveyors for receiving unsorted, mixed waste;
   a plurality of substantially identical work modules serially located along the length of each of the feed conveyors;
   a first receiving hopper and drop chute at each work module;
   a first conveyor below the first drop chutes of a plurality of work modules for continuously moving a separated first valuable component away from the work modules to a first location;
   a second receiving hopper and drop chute at each work module;
   a second conveyor below the second drop chutes of a plurality of work modules for continuously moving a separated second valuable component away from the work modules to a second location remote from the first location;
   a third receiving hopper and drop chute at each work module for receiving a third valuable component of mixed domestic waste;
   a third conveyor for the third component below the third drop chutes of a plurality of work modules for continuously moving the separated third component away from the work modules to a third location remote from the first and second locations;
   a receiving fourth hopper and drop chute at each work module for receiving a fourth valuable component of mixed domestic waste; and
   a fourth conveyor for the fourth component below the fourth drop chutes of a plurality of work modules for continuously moving the separated fourth component away from the work modules to a fourth location remote from the first, second and third locations.

8. An apparatus as defined in claim 7, wherein the means for receiving unsorted, mixed waste comprises a refuse conveyor transverse to the plurality of feed conveyors for collecting and discharging unsorted, mixed waste therefrom.

9. An apparatus for separating valuable components from mixed domestic waste or the like comprising:
   a plurality of feed conveyors for continuously moving mixed waste along parallel horizontal open paths;
   means at the discharge end of the feed conveyors for receiving unsorted, mixed waste;
   a plurality of work modules serially located along the length of each of the feed conveyors;
   a first receiving hopper and drop chute at each work module;
   a first conveyor below the first drop chutes of a plurality of work modules for continuously moving a separated first valuable component away from the work modules to a first location;
   a second receiving hopper and drop chute at each work module;
   a second conveyor below the second drop chutes of a plurality of work modules for continuously moving a separated second valuable component away from the work modules to a second location remote from the first location;

a plurality of parallel first conveyors transverse to the direction of the feed conveyors, each first conveyor being below a plurality of first component receiving hoppers and drop chutes at work modules along separate feed conveyors for continuously moving the separated first component laterally from the apparatus in a first direction; and a plurality of parallel second conveyors transverse to the direction of the feed conveyors, each second conveyor being below a plurality of second component receiving hoppers and drop chutes at work modules along separate feed conveyors for continuously moving the separated second component laterally from the apparatus in the second direction.

10. An apparatus as defined in claim 9, further comprising a plurality of third conveyors for third components of the mixture, said conveyors extending parallel to the feed conveyor and on a lower level therefrom for removing third components to a third location remote from the first and second locations; and a collection conveyor transverse to the third conveyors at the discharge ends thereof for collecting components discharged from the plurality of third conveyors.

11. An apparatus for separating valuable components from mixed domestic waste or the like comprising:

a plurality of feed conveyors for continuously moving mixed waste along parallel horizontal open paths;

means at the discharge end of the feed conveyors for receiving unsorted, mixed waste;

a plurality of work modules serially located along the length of each of the feed conveyors;

a first receiving hopper and drop chute at each work module;

a first conveyor below the first drop chutes of a plurality of work modules for continuously moving a separated first valuable component away from the work modules to the first location;

a second receiving hopper and drop chute at each work module; and a second conveyor below the second drop chutes of a plurality of work modules for continuously moving a separated second valuable component away from the work modules to a second location remote from the first location; and wherein each of the work modules comprises a manual sorting station providing a worker position between dissimilar hoppers; and further comprising a worker position between each pair of adjacent work modules providing manual access to one type of hopper at one work module and another type of hopper at the adjacent work module so that manual selection and removal of the same selected components is provided repetitively along each of the feed conveyors.

12. An apparatus for separating valuable components from mixed domestic waste or the like comprising:

a plurality of feed conveyors for continuously moving mixed waste along parallel horizontal open paths;

means at the discharge end of the feed conveyors for receiving unsorted, mixed waste;

a plurality of work modules serially located along the length of each of the feed conveyors;

a first receiving hopper and drop chute at each work module;

a first conveyor below the first drop chutes of a plurality of work modules for continuously moving a separated first valuable component away from the work modules to a first location;

a second receiving hopper and drop chute at each work module; and a second conveyor below the second drop chutes of a plurality of work modules for continuously moving a separated second valuable component away from the work modules to a second location remote from the first location; and wherein the first and second valuable components are paper and cardboard, respectively, and the first and second conveyors are each transverse to the feed conveyor, and movable in opposite directions for conveying bulky paper and cardboard laterally from opposite sides of the apparatus, and further comprising:

a third receiving hopper and drop chute at each work module for receiving a valuable component having a lesser volume than separated paper and cardboard; and a third conveyor parallel to the feed conveyor below the third receiving hopper at drop chute at each work module for continuously moving the third separated component from the apparatus.

13. A reclamation station for recovering a plurality of valuable components from domestic waste comprising:

means for receiving mixed domestic waste from trucks or the like;

means for conveying mixed domestic waste continuously through at least a portion of the station;

a plurality of serially arranged sorting stations along the means for conveying for selectively separating individual valuable components from the mixed domestic waste;

means for discharging mixed refuse from the means for conveying; and a three-dimensional matrix of conveyor means each for an individual separated valuable component for continuously removing the respective separated component from the sorting stations to a plurality of separate locations, the conveyor means including:

a plurality of parallel first conveyors running in a first direction and below the means for conveying mixed waste; and a plurality of parallel second conveyors running in a second direction and below the means for conveying mixed waste.

14. A reclamation station for recovering paper, cardboard, metal, and other valuable components from domestic waste comprising:

means for receiving mixed domestic waste from trucks or the like;

means for conveying mixed domestic waste continuously through at least a portion of the station;

a plurality of serially arranged sorting stations along the means for conveying for selectively separating paper, cardboard, metal and other valuable components from the mixed domestic waste;

means for discharging mixed refuse from the means for conveying; and a plurality of conveyor means each for a separated paper, cardboard, metal or another separated valuable component for continuously removing the respective separated component from the sorting stations to a plurality of separate locations, the conveyor means being at a lower elevation than the means for conveying; and wherein the plurality of conveyor means comprises a three-dimensional matrix comprising:

a plurality of parallel paper conveyors running in a first direction and below the means for conveying mixed waste;

a plurality of parallel cardboard conveyors running in a second direction and below the means for conveying mixed waste; and a plurality of parallel third conveyors running in a third direction and below the means for conveying mixed waste.

15. A reclamation station as defined in claim 14, wherein each sorting station comprises:

a paper hopper for receiving paper;

drop chute means for guiding paper downwardly from the paper hopper to a paper conveyor;

a cardboard hopper for receiving cardboard;

drop chute means for guiding cardboard downwardly from the cardboard hopper to a cardboard conveyor;
a third hopper for receiving a third component;
drop chute means for guiding the third component to a third conveyor; and
a worker station for providing manual access to the means for conveying mixed waste and to at least a pair of hoppers for dissimilar components.

16. A reclamation station as defined in claim 15, further comprising:
a second worker station between each adjacent pair of sorting stations along the means for conveying mixed waste for providing manual access to one type of hopper at one sorting station and to a different type of hopper at the adjacent sorting station.

17. A reclamation station as defined in claim 14, further comprising:
a paper baler for receiving paper discharged from the paper conveyors;
a cardboard baler for receiving cardboard discharged from the cardboard conveyors.